Patented July 1, 1952

2,602,091

UNITED STATES PATENT OFFICE 2,602,091

PROCESS FOR PURIFYING THE POLY-CHLOROPHENOXY-ALIPHATIC-MONO-CARBOXYLIC ACIDS

Robert C. Dosser and Amerst E. Colby, Midland, Mich., assignors to The Dow Chemical Company, Midland, Mich., a corporation of Delaware No Drawing. Application January 2, 1951,
Serial No. 204,076

6 Claims. (Cl. 260—525)

The present invention is concerned with the polychlorophenoxy - aliphatic - monocarboxylic acids and is particularly directed to an improved method for the purification of these compounds.

It is well known that the polychlorophenoxy-aliphatic-monocarboxylic acids may be prepared by the reaction of the alkali metal salts of the chloroaliphatic acids with the alkali metal salts of the polychlorophenols. Although this method permits of the economical formation of technical grades of the acids, subsequent purification of the products in a form which is substantially free of undesirable odor and color has proven both difficult and not commercially feasible from the standpoint of economy.

The technical grade products as obtained from the practice of the above-described process are crystalline solids characterized by obnoxious phenolic odors and yellow, green, red and gray coloration. The purification of these materials has previously been accomplished through the medium of repeated crystallizations from various organic solvents. Sometimes such repeated crystallizations have been coupled with other means of purification, e. g., treatment with an absorptive agent such as activated charcoal or silica gel, in order to obtain products which are satisfactory from the standpoint of odor and color. Other methods of purification such as fractional distillation under reduced pressure are troublesome and costly at best, and particularly difficult due to the tendency of the acid compounds to decompose at elevated temperatures.

It is an object of the present invention to provide an improved method for purification of the technical polychlorophenoxy - aliphatic - monocarboxylic acids. A further object is to provide an improved method for the manufacture of polychlorophenoxy - aliphatic - monocarboxylic acids of improved color and odor characteristics. Other objects will become apparent from the following description of the invention.

According to the present invention, it has been discovered that the odor and color characteristics of technical polychlorophenoxy-aliphatic-monocarboxylic acids may be improved by subjecting an aqueous dispersion, i. e., a suspension or a solution, of an alkali metal salt of such acid, to the action of an alkali metal hypochlorite. Following the treatment with the hypochlorite, the aqueous dispersion is freed of excess hypochlorite and thereafter acidified to precipitate the purified organic acid. The latter may be recovered and separated from water-soluble impurities by filtration. The product obtained in such operation is much superior to the technical polychlorophenoxy - aliphatic - monocarboxylic acids as regards odor and color.

The amount of hypochlorite employed in the treatment of the salts of the technical polychlorophenoxy-aliphatic-monocarboxylic acids is preferably the minimum amount necessary to accomplish the desired result, although a reasonable excess is operable. This required amount of hypochlorite varies with the particular acid and with the degree of purity of the particular acid under treatment. The hypochlorite is ordinarily employed in the form of an aqueous solution. The amount of hypochlorite employed is generally from about 2 to 6 per cent by weight of the technical polychlorophenoxy-aliphatic-monocarboxylic acid to be purified. In the case of very impure technical acid products, somewhat larger amounts of hypochlorite may be required. In practice, the hypochlorite solution is added portionwise with stirring to the organic salt dispersion until no further clarification or decolorization is accomplished by the addition of further amounts.

The desired action by the hypochlorite takes place smoothly at a temperature of from 25° to 100° C. or slightly higher. In carrying out the purification, operation at the boiling temperature of the aqueous dispersion and under reflux is sometimes convenient.

The rate at which the purification takes place has been found to vary directly with the temperature employed. In practice, the treatment with the hypochlorite is usually carried out over a period of from 0.25 to 3 hours. The preferred operation is carried out at 85° to 100° C., at which temperatures, the addition of the hypochlorite is generally carried out in from about 15 to 35 minutes.

For the successful practice of the method of the present invention, any excess hypochlorite in the aqueous dispersion of organic acid salt must be decomposed prior to the precipitation of the free polychlorophenoxy-aliphatic-monocarboxylic acid. Precipitation of the acid from a solution having a positive titer for the hypochlorite may result in a product of undesirable color.

The hypochlorites employed in accordance with the present method are somewhat unstable at the higher operating temperatures and particularly under conditions of neutrality in the aqueous dispersion. Accordingly, any excess hypochlorite in the reaction mixture may be decomposed by continued heating of the dispersion up to the boiling temperature for a period of time, and such decomposition may be hastened by adjusting the hydrogen ion concentration in the mixture to a pH of from 7 to 8. This may be accomplished by the addition of small amounts of dilute aqueous mineral acid, e. g., hydrochloric acid. In an alternative method, the decomposition of any excess hypochlorite may be brought about by the addition of a small amount of hydrogen peroxide ($H_2O_2$) to the mixture.

Following the decomposition of excess hypochlorite, the hypochlorite-free dispersion is acidified at a pH of at least 0.5 or higher, and preferably between pH 0.5 and pH 1.5, with a sufficient amount of a strong mineral acid, and preferably hydrochloric acid, to liberate the polychlorophenoxy - aliphatic - monocarboxylic acid. Such acidification is conveniently carried out by simultaneously and separately metering the aqueous dispersion of the organic salt and the hydrochloric acid into an acidification vessel with stirring and at such a rate that the pH of the mixture in the acidification vessel is always at least 0.5. The latter limitation is critical since the precipitation of the acid at a pH of less than 0.5 results in the recovery of a product of undesirable color.

In an alternative method, the acidification may be carried out by adding the organic salt dispersion portion wise to an aqueous solution of hydrochloric acid of a pH of at least 0.5.

In carrying out the method of the present invention, the aqueous solution of the alkali metal hypochlorite is added portionwise to the aqueous dispersion of the alkali metal salt of the technical polychlorophenoxy-aliphatic-monocarboxylic acid until no perceptible change in color of the organic salt dispersion takes place. The addition is carried out with stirring and at a temperature of from 25° to 100° C. Following the hypochlorite treatment, the excess hypochlorite is decomposed by continued heating up to the boiling temperature of the dispersion or by partial neutralization or the addition of a small amount of hydrogen peroxide as previously described. The hypochlorite-free product is then acidified to liberate the polychlorophenoxyaliphatic-monocarboxylic acid. The latter may be filtered to separate the desired purified product.

The following examples illustrate the invention but are not to be construed as limiting:

Example 1

110 grams of an amber-colored technical 2,4-dichlorophenoxyacetic acid (M. P. 137.6°–139.6° C.) of high phenolic odor was dispersed in 300 milliliters of water and the resulting mixture neutralized with a slight excess of potassium hydroxide to prepare an aqueous slurry of potassium 2,4-dichlorophenoxyacetate. The foregoing slurry was heated to 90° C., at which temperature it became a solution. An aqueous solution containing 11.8 per cent by weight of sodium hypochlorite was then slowly added portionwise to the above mixture with stirring until the solution appeared to be substantially colorless and no further perceptible change in color took place with the introduction of additional hypochlorite. The treatment required the employment of 20 milliliters of the hypochlorite solution which was added to the salt solution over a period of 0.5 hour. Following the hypochlorite addition, the excess hypochlorite was decomposed by continued heating up to the boiling temperature of the solution. The hypochlorite-free product was thereafter filtered, and the filtrate acidified at a pH greater than 0.5 with a sufficient quantity of hydrochloric acid to liberate the 2,4-dichlorophenoxy-acetic acid. The acidified mixture was then cooled to room temperature and filtered to separate as a residue 2,4-dichlorophenoxyacetic acid as white crystals free of undesirable organic odor. This product was washed with water and dried. The melting point of the dried acid agreed exactly with that of the original technical material.

Example 2

An aqueous dispersion of potassium 2,4-dichlorophenoxyacetate was prepared by neutralizing with a slight excess of potassium hydroxide a slurry in 300 milliliters of water of 110 grams of the same technical 2,4-dichlorophenoxyacetic acid as described in Example 1. 80 milliliters of an aqueous solution containing 3.1 per cent by weight of potassium hypochlorite was added portionwise over a period of 0.5 hour to the above mixture at 90° C. with stirring to produce a solution which was substantially colorless. The treated salt dispersion was thereafter processed in the manner as described in Example 1 to obtain white, crystalline 2,4-dichlorophenoxyacetic acid, melting at 138.0° to 139.6° C. and of much improved odor.

Example 3

An aqueous dispersion of sodium 2,4-dichlorophenoxyacetate was prepared by neutralizing with a slight excess of sodium hydroxide a slurry in 300 milliliters of water of 110 grams of technical 2,4-dichlorophenoxyacetic acid as described in Example 1. 15 milliliters of an aqueous solution containing 15.2 per cent by weight of sodium hypochlorite was added portionwise to the above mixture with stirring over a period of 18 minutes at 90° C. to produce a solution which was substantially colorless. The excess hypochlorite in the mixture was then decomposed by the addition of one milliliter of hydrogen peroxide, and the resulting mixture acidified and filtered as previously described to separate the 2,4-dichlorophenoxyacetic acid as a white crystalline solid which was substantially free of any undesirable odor.

Example 4

80 grams of a straw-colored technical 2,4,5-trichlorophenoxyacetic acid (M. P. 150.5°–154.0° C.) having a strongly phenolic odor, was dispersed in 770 milliliters of water and the resulting dispersion neutralized with a slight excess of sodium hydroxide. 20 milliliters of an aqueous solution containing 11.8 percent by weight of sodium hypochlorite was then added portionwise to the above mixture with stirring and at a temperature of 90° C. to produce a solution which was substantially colorless. Following the purification, the excess hypochlorite was decomposed and the hypochlorite-free product treated as previously described to separate a white, crystalline 2,4,5-trichlorophenoxyacetic acid product which was substantially free of any undesirable odor. The melting point of the purified acid was identical with that of the original technical material.

Example 5

An aqueous dispersion of sodium 2,4-dichlorophenoxyacetic acid was prepared by neutralizing with a slight excess of sodium hydroxide a slurry in 280 milliliters of water of 110 grams of technical 2,4-dichlorophenoxy acetic acid. This latter product was yellow to amber in color and of strong chlorophenolic odor. 20 milliliters of an aqueous solution containing 11.8 per cent by weight of sodium hypochlorite was added in two equal portions to the above slurry at 25° C. The additions were made ½ hour apart. Stirring was thereafter continued for about one hour, following which time the slurry appeared substantially white. The treated slurry was then acidified in the usual fashion to obtain 2,4-dichlorophenoxyacetic acid as a white crystalline solid which was substantially free of any undesirable odor.

Other technical polychlorophenoxy-aliphatic-monocarboxylic acids, such as β-2,4-dichlorophenoxypropionic acid, α- and β-2,4,5-trichlorophenoxypropionic acid, 2,3,4,6-tetrachlorophenoxyacetic acid and pentachlorophenoxyacetic acid, may similarly be purified by the treatment of an aqueous dispersion of an alkali metal salt of such acid with an alkali metal hypochlorite in the manner as described in the preceding examples.

We claim:

1. A method for the purification of a technical polychlorophenoxy-aliphatic monocarboxylic acid which comprises the steps of (1) contacting an alkali metal salt of said technical acid with an alkali metal hypochlorite in aqueous dispersion, (2) decomposing any excess hypochlorite in the mixture, and (3) acidifying the mixture to precipitate the polychlorophenoxy-aliphatic-monocarboxylic acid.

2. A method for the purification of a technical polychlorophenoxy-aliphatic-monocarboxylic acid which comprises the steps of (1) mixing together in aqueous dispersion (a) an alkali metal salt of said organic acid and (b) an alkali metal hypochlorite in the amount of from 2 to 6 per cent by weight of the technical organic acid, (2) decomposing any excess hypochlorite in the mixture, and (3) acidifying the mixture to precipitate the polychlorophenoxy-aliphatic-monocarboxylic acid, the hydrogen ion concentration of the aqueous mixture being maintained at a pH of at least 0.5 throughout the precipitation.

3. A method for the purification of a technical polychlorophenoxy-aliphatic-monocarboxylic acid which comprises the steps of (1) contacting an alkali metal salt of said technical acid with an alkali metal hypochlorite in aqueous dispersion, (2) decomposing any excess hypochlorite in the mixture, (3) acidifying the mixture to precipitate the organic acid and (4) filtering the mixture to recover the purified polychlorophenoxy-aliphatic-monocarboxylic acid.

4. A method for the purification of a technical polychlorophenoxy-aliphatic-monocarboxylic acid which comprises the steps of (1) mixing together in aqueous dispersion (a) the sodium salt of said technical acid and (b) sodium hypochlorite in the amount of from 2 to 6 per cent by weight of the technical acid, (2) decomposing any excess hypochlorite in the mixture, and (3) acidifying the mixture to precipitate the polychlorophenoxy-aliphatic-monocarboxylic acid, the hydrogen ion concentration in the mixture being maintained at a pH of at least 0.5 throughout the precipitation.

5. The method claimed in claim 2, wherein the polychlorophenoxy-aliphatic-monocarboxylic acid is 2,4-dichlorophenoxyacetic acid.

6. The method claimed in claim 2, wherein the polychlorophenoxy-aliphatic-monocarboxylic acid is 2,4,5-trichlorophenoxyacetic acid.

ROBERT C. DOSSER.
AMERST E. COLBY.

REFERENCES CITED

The following references are of record in the file of this patent:

UNITED STATES PATENTS

| Number | Name | Date |
|---|---|---|
| 2,170,972 | Martin | Aug. 29, 1939 |
| 2,419,256 | Dorn | Apr. 22, 1947 |
| 2,471,575 | Manske | May 31, 1949 |